United States Patent
Nagamine et al.

(10) Patent No.: US 12,537,223 B2
(45) Date of Patent: Jan. 27, 2026

(54) BATTERY

(71) Applicant: Panasonic Intellectual Property Management Co., Ltd., Osaka (JP)

(72) Inventors: Kenta Nagamine, Osaka (JP); Izuru Sasaki, Aichi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 615 days.

(21) Appl. No.: 17/966,436

(22) Filed: Oct. 14, 2022

(65) Prior Publication Data

US 2023/0067002 A1     Mar. 2, 2023

Related U.S. Application Data (63) Continuation of application No. PCT/JP2021/014087, filed on Mar. 31, 2021.

(30) Foreign Application Priority Data

Apr. 20, 2020 (JP) ................. 2020-074516

(51) Int. Cl.
*H01M 10/0562* (2010.01)
*H01M 10/052* (2010.01)
*H01M 10/44* (2006.01)

(52) U.S. Cl.
CPC ..... *H01M 10/0562* (2013.01); *H01M 10/052* (2013.01); *H01M 10/446* (2013.01); *H01M 2300/008* (2013.01)

(58) Field of Classification Search
CPC .. H01M 10/44; H01M 10/446; H01M 10/052; H01M 10/0562; H01M 2300/008

USPC .......................................... 429/323
See application file for complete search history.

(56) References Cited

U.S. PATENT DOCUMENTS

| | | | |
|---|---|---|---|
| 2017/0250439 | A1 | 8/2017 | Nitta et al. |
| 2020/0350624 | A1 | 11/2020 | Sasaki et al. |
| 2020/0350626 | A1 | 11/2020 | Matsumura et al. |
| 2020/0350627 | A1 | 11/2020 | Sugimoto et al. |

(Continued)

FOREIGN PATENT DOCUMENTS

| | | |
|---|---|---|
| JP | 2006-244734 A | 9/2006 |
| JP | 2017-152352 A | 8/2017 |
| WO | 2019/146217 A1 | 8/2019 |

(Continued)

OTHER PUBLICATIONS

International Search Report issued on Jun. 1, 2021 in International Patent Application No. PCT/JP2021/014087, with English translation.

*Primary Examiner* — Kevin P Kerns
(74) *Attorney, Agent, or Firm* — Rimon P.C.

(57) ABSTRACT

A battery of the present disclosure includes a positive electrode, a negative electrode, and an electrolyte layer provided between the positive electrode and the negative electrode. The positive electrode contains a positive electrode active material and a first solid electrolyte. The electrolyte layer contains a second solid electrolyte. The first solid electrolyte contains lithium and two or more types of anions. The second solid electrolyte contains lithium and two or more types of anions. The molar ratio of Br to the two or more types of anions contained in the first solid electrolyte is smaller than the molar ratio of Br to the two or more types of anions contained in the second solid electrolyte.

15 Claims, 5 Drawing Sheets

(56) References Cited

U.S. PATENT DOCUMENTS

2021/0234158 A1 7/2021 Washida et al.

FOREIGN PATENT DOCUMENTS

| WO | 2019/146236 A1 | 8/2019 |
| WO | 2019/146294 A1 | 8/2019 |
| WO | 2020/067425 A1 | 4/2020 |

BATTERY

This application is a continuation of PCT/JP2021/014087 filed on Mar. 31, 2021, which claims foreign priority of Japanese Patent Application No. 2020-074516 filed on Apr. 20, 2020, the entire contents of both of which are incorporated herein by reference.

BACKGROUND OF THE INVENTION

1. Field of the Invention

The present disclosure relates to a battery.

2. Description of Related Art

JP 2006-244734 A discloses a battery in which a halide containing indium is used as a solid electrolyte. WO 2019/146236 discloses deterioration of battery characteristics caused by oxidative degradation of iodine contained in halide solid electrolytes.

SUMMARY OF THE INVENTION

Conventionally, there has been a demand for improvement in charge and discharge efficiency of batteries.

A battery according to one aspect of the present disclosure is a battery including:
- a positive electrode;
- a negative electrode; and
- an electrolyte layer provided between the positive electrode and the negative electrode, wherein
- the positive electrode contains a positive electrode active material and a first solid electrolyte,
- the electrolyte layer contains a second solid electrolyte,
- the first solid electrolyte contains lithium and two or more types of anions,
- the second solid electrolyte contains lithium and two or more types of anions, and a molar ratio of Br to the two or more types of anions contained in the first solid electrolyte is smaller than a molar ratio of Br to the two or more types of anions contained in the second solid electrolyte.

The present disclosure can improve the charge and discharge efficiency of batteries.

DETAILED DESCRIPTION

Embodiment 1

A battery according to Embodiment 1 includes a positive electrode, a negative electrode, and an electrolyte layer provided between the positive electrode and the negative electrode. The positive electrode contains a positive electrode active material and a first solid electrolyte. The electrolyte layer contains the second solid electrolyte. The first solid electrolyte contains lithium and two or more types of anions. The second solid electrolyte contains lithium and two or more types of anions. The molar ratio of Br to the two or more types of anions contained in the first solid electrolyte is smaller than the molar ratio of Br to the two or more types of anions contained in the second solid electrolyte.

The above configuration can improve the charge and discharge efficiency of the battery.

JP 2006-244734 A describes that, in an all-solid-state secondary battery including an indium-containing compound as a solid electrolyte, it is desirable that a positive electrode active material have a potential vs. Li of 3.9 V or less on average, and this allows favorable formation of a coating of a degradation product generated through oxidative degradation of the solid electrolyte, resulting in good charge and discharge characteristics. As the positive electrode active material having a potential vs. Li of 3.9 V or less on average, JP 2006-244734 A discloses widely used layered transition metal oxide positive electrodes such as $LiCoO_2$ and $LiNi_{0.8}Co_{0.15}Al_{0.05}O_2$.

WO 2019/146236 discloses that, since an iodine-containing halide solid electrolyte lacks electrochemical stability and thus causes oxidation-reduction to proceed continuously, oxidative degradation occurs even with the use of a positive electrode having an average discharge voltage of 3.9 V or less versus Li electrode. WO 2019/146236 also discloses that a bromine-containing halide solid electrolyte, in contrast, exhibits good charge and discharge characteristics even when charging is performed using a voltage of 4.0 V or more versus Li electrode. WO 2019/146236 also discloses, in order to inhibit oxidative degradation of an iodine-containing solid electrolyte, coating a positive electrode active material with a solid electrolyte that is composed of lithium, a metal element or metalloid element, and chlorine or bromine.

On the other hand, the present inventors found through studies that, even in the case where a positive electrode includes a solid electrolyte that does not contain iodine but contains bromine, oxidation of bromine occurs when a battery is charged with a potential of 3.5 V or more versus Li electrode, whereby the charge and discharge efficiency of the battery is deteriorated. Oxidation of bromine in this case means that, when the solid electrolyte containing bromine comes into contact with a material having electron conductivity, such as a current collector or an active material, and is exposed to a potential of 3.5 V or more versus Li electrode, electrons are extracted from the bromine in the solid electrolyte. During charging of the battery, if not only a reaction in which electrons are extracted from the active material but also extraction of electrons from the bromine in the solid electrolyte occurs, an excess quantity of electricity is observed. On the other hand, since a reversible reduction reaction derived from the bromine does not occur during discharging, the ratio between the quantity of electricity during charging and the quantity of electricity during discharging, i.e., the charge and discharge efficiency, is reduced. Accordingly, it is desirable that a solid electrolyte should not contain elements with a low redox potential, such as bromine and iodine.

However, since bromine and iodine have higher electronic polarizability than chlorine and fluorine, a solid electrolyte containing bromine and iodine provides a smaller energy barrier for lithium ion conduction and thus exhibits high lithium ion conductivity. In contrast, a solid electrolyte containing only chlorine and/or fluorine exhibits low ionic conductivity, which increases the discharge polarization and thus deteriorates the charge and discharge efficiency.

Halogens, which have high electronegativity and high ionicity, are less likely to be stabilized by other cations or anions contained in a solid electrolyte. Accordingly, attention should be directed not to the composition of the solid electrolyte as a whole including cations but to the ratio of an element that contributes to oxidation, i.e., bromine in anions.

In a battery configured according to a certain embodiment of the present disclosure, a positive electrode contains a positive electrode active material and a first solid electrolyte. An electrolyte layer contains a second solid electrolyte. The first solid electrolyte contains lithium and two or more types of anions. The second solid electrolyte contains lithium and two or more types of anions. The molar ratio of bromine to the two or more types of anions contained in the first solid electrolyte is smaller than the molar ratio of bromine to the two or more types of anions contained in the second solid electrolyte. The above configuration reduces, in the positive electrode, the probability of occurrence of contact between bromine in the first solid electrolyte and materials having electron conductivity, such as a current collector and the positive electrode active material. As a result, oxidation of the first solid electrolyte can be inhibited. Further, when the first solid electrolyte contains bromine having high electronic polarizability, the first solid electrolyte exhibits higher ionic conductivity than solid electrolytes that do not contain bromine. Accordingly, this can improve the charge and discharge efficiency of the battery.

The first solid electrolyte contains, for example, a material represented by the following composition formula (1). In the composition formula (1), M1 includes at least one element selected from the group consisting of a metalloid element and a metal element other than Li. X1 is an anion other than CL and Br. $a1>0$, $b1>0$, $c1\geq0$, $d1\geq0$, $c1+d1>0$, and $e1\geq0$ are satisfied.

$$Li_{a1}M1_{b1}Br_{c1}Cl_{d1}X1_{e1} \quad (1)$$

The anion other than Cl and Br is not limited to particular types of anions. Examples of the anion other than Cl and Br include oxygen and iodine (I). X1 may be I.

Metalloid elements include B, Si, Ge, As, Sb, and Te. Metal elements include: all elements included in Groups 1 to 12 of the periodic table, except for hydrogen; and all elements included in Groups 13 to 16 of the periodic table, except for B, Si, Ge, As, Sb, Te, C, N, P, O, S, and Se. Metal elements are a group of elements that can be cations when they form an inorganic compound with a halogen or with a halogen compound. M1 includes at least one selected from the group consisting of these elements.

The second solid electrolyte contains, for example, a material represented by the following composition formula (2). In the composition formula (2), M2 includes at least one element selected from the group consisting of a metalloid element and a metal element other than Li. X2 is an anion other than Cl and Br. $a2>0$, $b2>0$, $c2\geq0$, $d2\geq0$, $c2+d2>0$, and $e2\geq0$ are satisfied.

$$Li_{a1}M2_{b2}Br_{c2}Cl_{d2}X2_{e2} \quad (2)$$

The anion other than Cl and Br is not limited to particular types of anions. Examples of the anion other than Cl and Br include oxygen and iodine (I). X2 may be I.

As with M1, M2 includes at least one element selected from the group consisting of the above-described elements. M2 may be the same as or different from M1.

The total amount of substance of the anions in the first solid electrolyte is defined as $\alpha1$, and the amount of substance of a bromine anion in the first solid electrolyte is defined as $\beta1$. The total amount of substance of the anions in the second solid electrolyte is defined as $\alpha2$, and the amount of substance of a bromine anion in the second solid electrolyte is defined as $\beta2$. In this case, the relationship $\beta1/\alpha1<\beta2/\alpha2$ is satisfied.

The above composition allows smooth ion transport through the first solid electrolyte and the second solid electrolytes, whereby the charge and discharge efficiency of the battery can be further improved.

The first solid electrolyte may contain Br as an essential element. One of the two or more types of anions contained in the first solid electrolyte may be Br. In this case, the first solid electrolyte exhibits high ionic conductivity. This enables still higher charge and discharge efficiency.

The second solid electrolyte may contain Br as an essential element. One of the two or more types of anions contained in the second solid electrolyte may be Br. In this case, the second solid electrolyte exhibits high ionic conductivity. This enables still higher charge and discharge efficiency.

The two or more types of anions contained in the first solid electrolyte may be the same as or different from the two or more types of anions contained in the second solid electrolyte. In the former case, the material cost can be reduced. In the latter case, the degree of freedom in material design increases.

The electrolyte layer may include a first electrolyte layer and a second electrolyte layer. The first electrolyte layer contains the second solid electrolyte. The second electrolyte layer is located between the positive electrode and the first electrolyte layer and contains a third solid electrolyte. The third solid electrolyte may contain lithium and two or more types of anions.

The third solid electrolyte may contain Br as an essential element. One of the two or more types of anions contained in the third solid electrolyte may be Br. In this case, the third solid electrolyte exhibits high ionic conductivity. This enables still higher charge and discharge efficiency.

The two or more types of anions contained in the third solid electrolyte may be the same as or different from the two or more types of anions contained in the first solid electrolyte. In the former case, the material cost can be reduced. In the latter case, the degree of freedom in material design increases. For the same reason, the two or more types of anions contained in the third solid electrolyte may be the same as or different from the two or more types of anions contained in the second solid electrolyte.

The third solid electrolyte contains, for example, a material represented by the following composition formula (3). In the composition formula (3), M3 includes at least one element selected from the group consisting of a metalloid element and a metal element other than Li. X3 is an anion other than Cl and Br. $a3>0$, $b3>0$, $c3\geq0$, $d3\geq0$, $c3+d3>0$, and $e3\geq0$ are satisfied.

$$Li_{a3}M3_{b3}Br_{c3}Cl_{d3}X3_{e3} \quad (3)$$

The anion other than Cl and Br is not limited to particular types of anions. Examples of the anion other than Cl and Br include oxygen and iodine (I). X3 may be I.

As with M1, M3 includes at least one element selected from the group consisting of the above-described elements. M3 may be the same as or different from M1. M3 may be the same as or different from M2.

The total amount of substance of the anions in the first solid electrolyte is defined as $\alpha 1$, and the amount of substance of a bromine anion in the first solid electrolyte is defined as $\beta 1$. The total amount of substance of the anions in the second solid electrolyte is defined as $\alpha 2$, and the amount of substance of a bromine anion in the second solid electrolyte is defined as $\beta 2$. The total amount of substance of the anions in the third solid electrolyte is defined as $\alpha 3$, and the amount of substance of a bromine anion in the third solid electrolyte is defined as $\beta 3$. In this case, the relationship $\beta 1/\alpha 1 \le \beta 3/\alpha 3 < \beta 2/\alpha 2$ is satisfied.

The above configuration is more effective in improving the charge and discharge efficiency of the battery, because the positive electrode active material can be prevented from being exposed from the positive electrode to come in contact with the first electrolyte layer and to cause oxidation of the solid electrolyte.

In the composition formula (1), the ratio a1/(c1+d1+e1) may be in the range from 0.3 to 0.6. When X1 is a halogen, the ratio a1/(c1+d1+e1) is the ratio of the amount of substance of lithium to the total amount of substance of halogens.

In the composition formula (2), the ratio a2/(c2+d2+e2) may be in the range from 0.3 to 1. When X2 is a halogen, the ratio a2/(c2+d2+e2) is the ratio of the amount of substance of lithium to the total amount of substance of halogens.

The above composition can improve the ionic conductivity of the first solid electrolyte and the second solid electrolyte, whereby the battery can achieve still higher charge and discharge efficiency.

In addition to the ratio a1/(c1+d1+e1) set in the range from 0.3 to 0.6 and the ratio a2/(c2+d2+e2) set in the range from 0.3 to 1, the ratio a3/(c3+d3+e3) may be in the range from 0.3 to 1 in the composition formula (3). When X3 is a halogen, the ratio a3/(c3+d3+e3) is the ratio of the amount of substance of lithium to the total amount of substance of halogens.

The above composition can improve the ionic conductance of the first solid electrolyte, the second solid electrolyte, and the third solid electrolyte, whereby the battery can achieve still higher charge and discharge efficiency.

The ratio $\alpha 3/\beta 3$ may vary in the thickness direction of the second solid electrolyte layer. The ratio $\alpha 3/\beta 3$ on a positive electrode side may be lower than the ratio $\alpha 3/\beta 3$ on a first electrolyte layer side.

The battery configured as above is less susceptible to damage caused by thermal shock. Since the second electrolyte layer has a material composition that varies continuously, the thermal expansion coefficient of the third solid electrolyte varies in a stepwise manner. Accordingly, the battery is less likely to be damaged even when subjected to an abrupt temperature change.

The positive electrode may contain an electron conductive material. The electron conductive material may be a conductive additive to be described below.

The above configuration inhibits oxidation of the first solid electrolyte caused by the electron conductive material, thereby allowing the effects to be exhibited more effectively.

M1 and M2 may include Y.

M1 and M2 may include Y and Zr.

M3 may include Y.

The above configuration can improve the ionic conductance of the third solid electrolyte, whereby the battery can achieve still higher charge and discharge efficiency.

M3 may include Y and Zr.

The above configuration can improve the ionic conductance of the third solid electrolyte, whereby the battery can achieve still higher charge and discharge efficiency.

The positive electrode active material may include a lithium-containing transition metal oxide. The positive electrode active material may have a layered structure.

The above configuration can improve the energy density of the battery.

The battery of the present disclosure can be produced in the following manner. First, a stack including a positive electrode, a negative electrode, and an electrolyte layer provided between the positive electrode and the negative electrode is produced. The positive electrode contains a positive electrode active material and a first solid electrolyte. The electrolyte layer contains a second solid electrolyte. The first solid electrolyte contains lithium and two or more types of anions. The second solid electrolyte contains lithium and two or more types of anions. Thereafter, the stack is charged with a constant voltage that is equal to or higher than the voltage at which the potential of the positive electrode is equal to the oxidation potential of bromine contained in the first solid electrolyte.

According to such a method, the configuration of the present disclosure can be achieved more easily.

The first solid electrolyte, the second solid electrolyte, and the third solid electrolyte can be produced in the following manner, for example.

Raw material powders of a binary halide are prepared so as to achieve a blending ratio of an intended composition. For example, in order to produce $Li_3YBr_3Cl_3$, LiCl and $YBr_3$ are prepared at a molar ratio of 3:1.

"Li", "M1", "M2", "M3", "X1", "X2", and "X3" in the above-described composition formula can be determined by selecting the types of raw material powders at this time. Also, the above-described values "a1", "b1", "c1", "d1", "e1", "a2", "b2", "c2", "d2", "e2", "a3", "b3", "c3", "d3", and "e3" can be adjusted by adjusting the blending ratio of the raw materials and the synthesis process.

After mixing the raw material powders well, the raw material powders are mixed, milled, and reacted with each other using a mechanochemical milling method. Alternatively, after mixing the raw material powders well, the resulting mixture may be fired in an inert atmosphere.

In this manner, the above-described solid electrolyte is obtained.

The structure of the crystal phase (i.e., crystal structure) in the solid electrolyte can be determined by adjusting the method for reacting the raw material powders with each other and conditions of the reaction.

The method for adjusting the composition parameters "a1", "b1", "c1", "d1", "e1", "a2", "b2", "c2", "d2", "e2", "a3", "b3", "c3", "d3", and "e3" is not limited to particular methods. For example, the blending ratio of raw material powders may be adjusted so as to satisfy the relationship of c1/(c1+d1+e1)<c3/(c3+d3+e3)<c2/(c2+d2+e2) at the time of producing a solid electrolyte, then the solid electrolyte may be produced, and thus a battery that satisfies the above relationship may be produced. Alternatively, the parameters may be adjusted by subjecting a battery to an electrochemical treatment, i.e., passing an electric current through the battery, during or after the production of the battery.

Embodiment 2

Figure 1A:
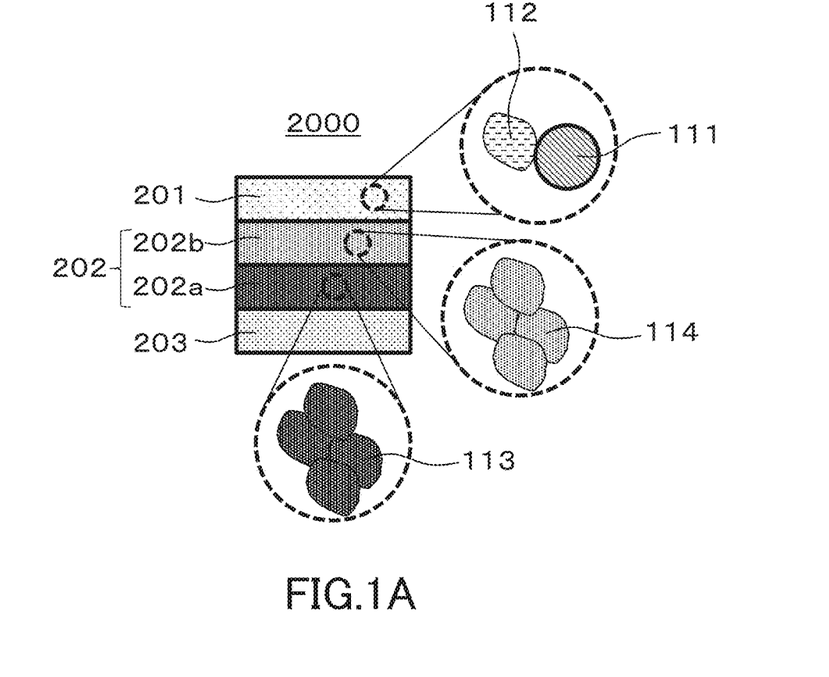
FIG. 1A is a cross-sectional view schematically showing the structure of a battery according to Embodiment 2.

FIG. 1A is a cross-sectional view schematically showing the structure of a battery 2000 according to Embodiment 2. The battery 2000 according to Embodiment 2 includes a positive electrode 201, an electrolyte layer 202, and a negative electrode 203. The descriptions in Embodiment 1 also apply to Embodiment 2.

The positive electrode 201 contains a positive electrode active material 111 and a first solid electrolyte 112.

The electrolyte layer 202 is disposed between the positive electrode 201 and the negative electrode 203. The electrolyte layer 202 contains a second solid electrolyte 113.

More specifically, the electrolyte layer 202 includes a first electrolyte layer 202a and a second electrolyte layer 202b. The first electrolyte layer 202a contains the second solid electrolyte 113. The second electrolyte layer 202b is located between the positive electrode 201 and the first electrolyte layer 202a and contains a third solid electrolyte 114.

The first electrolyte layer 202a may have a thickness of 100 nm or more and 100 μm or less. When the thickness of the first electrolyte layer 202a is 100 nm or more, the occurrence of a short circuit between the positive electrode and the negative electrode can be reduced more effectively. When the thickness of the first electrolyte layer 202a is 100 μm or less, high power operation can be achieved.

The second electrolyte layer 202b may have a thickness of 1 nm or more and 100 μm or less. When the thickness of the second electrolyte layer 202b is 1 nm or more, the oxidation of the first electrolyte layer 202a can be reliably inhibited. When the thickness of the second electrolyte layer 202b is 100 μm or less, high power operation can be achieved.

A halide solid electrolyte may be used as the first solid electrolyte 112, the second solid electrolyte 113, and the third solid electrolyte 114. Examples of the halide solid electrolyte include $Li_3YBr_6$, $Li_3YBr_3Cl_3$, $Li_3YBr_2Cl_4$, $Li_3YCl_6$, and compounds obtained by substituting one or some cations in these compounds with Zr.

The first solid electrolyte 112, the second solid electrolyte 113, and the third solid electrolyte 114 may be halide solid electrolytes having compositions that differ from each other. That is, the molar ratio of bromine in the second solid electrolyte 113 may be greater than the molar ratio of bromine in the first solid electrolyte 112.

This can further improve the charge and discharge characteristics of the battery 2000.

The first solid electrolyte 112, the second solid electrolyte 113, and the third solid electrolyte 114 may each be a mixture of solid electrolytes having compositions that differ from each other. For example, a mixture of $Li_3YBr_6$ and LiCl or a mixture of $Li_3YCl_3Br_3$ and $Li_3YCl_6$ may be used.

This can further improve the charge and discharge characteristics of the battery 2000. The first solid electrolyte 112, the second solid electrolyte 113, and the third solid electrolyte 114 may be free from sulfur.

The shape of each of the first solid electrolyte 112, the second solid electrolyte 113, and the third solid electrolyte 114 is not limited to particular shapes, and may be, for example, an acicular shape, a spherical shape, an ellipsoidal shape, or a scale-like shape. For example, the first solid electrolyte 112 may be in the form of particles. Similarly, the second solid electrolyte 113 may be in the form of particles. The third solid electrolyte 114 may be in the form of particles.

When the first solid electrolyte 112 is in the form of particles (e.g., spherical), the median diameter of the group of particles of the first solid electrolyte 112 may be 100 μm or less. When the median diameter is 100 μm or less, the positive electrode active material 111 and the first solid electrolyte 112 can form a favorable dispersion state in the positive electrode 201. This improves the charge and discharge characteristics of the battery 2000. The median diameter of the group of particles of the first solid electrolyte 112 may be 10 μm or less.

This allows the positive electrode active material 111 and the first solid electrolyte 112 to form a favorable dispersion state in the positive electrode 201.

The term "median diameter" as used in the present specification means a particle diameter when the cumulative volume in the volumetric particle size distribution is equal to 50%. The volumetric particle size distribution is measured using a laser diffraction measurement device or an image analysis device, for example.

The positive electrode active material 111 contains a material having properties of occluding and releasing metal ions (e.g., lithium ions). Examples of the positive electrode active material 111 include lithium-containing transition metal oxides, transition metal fluorides, polyanion materials, fluorinated polyanion materials, transition metal sulfides, transition metal oxysulfides, and transition metal oxynitrides. In particular, when a lithium-containing transition metal oxide is used as the positive electrode active material 111, the battery can be produced at a low production cost and can have a high average discharge voltage.

The positive electrode active material 111 may contain Li and at least one element selected from the group consisting of Mn, Co, Ni, and Al. Examples of such a material include $Li(NiCoAl)O_2$, $Li(NiCoMn)O_2$, and $LiCoO_2$.

The positive electrode active material 111 may contain one active material or a plurality of active materials having compositions that differ from each other.

In the present embodiment, the positive electrode active material 111 may be $Li(NiCoMn)O_2$.

This can further improve the energy density and the charge and discharge efficiency of the battery 2000.

The positive electrode active material 111 may be in the form of particles, for example. The shape of the particles of the positive electrode active material 111 is not limited to particular shapes. The shape of the particles of the positive electrode active material 111 may be an acicular shape, a spherical shape, an ellipsoidal shape, or a scale-like shape.

The median diameter of the particles of the first solid electrolyte 112 may be smaller than the median diameter of the particles of the positive electrode active material 111.

This allows the first solid electrolyte 112 and the positive electrode active material 111 to form a more favorable dispersion state in the positive electrode 201.

The particles of the positive electrode active material 111 may have a median diameter of 0.1 μm or more and 100 μm or less.

When the median diameter of the particles of the positive electrode active material 111 is 0.1 μm or more, the positive electrode active material 111 and the first solid electrolyte 112 can form a favorable dispersion state in the positive electrode 201. As a result, the charge and discharge characteristics of the battery 2000 are improved.

When the median diameter of the particles of the positive electrode active material 111 is 100 μm or less, the lithium diffusion in the particles of the positive electrode active material 111 becomes faster. This enables high power operation of the battery 2000.

The median diameter of the particles of the positive electrode active material 111 may be larger than the median diameter of the particles of the first solid electrolyte 112. This allows the positive electrode active material 111 and the first solid electrolyte 112 to form a favorable dispersion state.

The positive electrode 201 may contain a plurality of particles of the first solid electrolyte 112 and a plurality of particles of the positive electrode active material 111.

The content of the first solid electrolyte 112 and the content of the positive electrode active material 111 in the positive electrode 201 may be the same or different from each other.

Regarding the volume ratio "v1:100−v1" between the positive electrode active material 111 and the first solid electrolyte 112 each contained in the positive electrode 201, 30≤v1≤95 may be satisfied. When 30≤v1 is satisfied, the battery 2000 can have a sufficient energy density. When v1≤95 is satisfied, high power operation becomes possible.

The positive electrode 201 may have a thickness of 10 μm or more and 500 μm or less. When the thickness of the positive electrode 201 is 10 μm or more, the battery 2000 can have a sufficient energy density. When the thickness of the positive electrode 201 is 500 μm or less, high power operation becomes possible.

The electrolyte layer 202 is a layer containing an electrolyte. The electrolyte is, for example, a solid electrolyte. In other words, the electrolyte layer 202 may be a solid electrolyte layer.

The electrolyte layer 202 may contain, as a solid electrolyte, at least one selected from the group consisting of a halide solid electrolyte, a sulfide solid electrolyte, an oxide solid electrolyte, a polymer solid electrolyte, and a complex hydride solid electrolyte.

As a halide solid electrolyte, any of the materials described above as specific examples of the first solid electrolyte 112, the second solid electrolyte 113, and the third solid electrolyte 114 may be used.

The above configuration can further improve the power density and the charge and discharge characteristics of the battery 2000.

The electrolyte layer 202 may contain a halide solid electrolyte having a composition that differs from those of the first solid electrolyte 112, the second solid electrolyte 113, and the third solid electrolyte 114. That is, the electrolyte layer 202 may contain a halide solid electrolyte having a composition that differs from that of the first solid electrolyte 112.

The electrolyte layer 202 may include, as a third electrolyte layer, another electrolyte layer provided between the first electrolyte layer 202a and the negative electrode 203. Another electrolyte layer contains a fourth solid electrolyte. Examples of the fourth solid electrolyte include the materials described above as examples of the material that can be used as the first solid electrolyte 112, the second solid electrolyte 113, and the third solid electrolyte 114.

As the first solid electrolyte 112, one of solid electrolytes to be described below as examples may be used alone, or two or more of them may be used in combination. The same applies to the second solid electrolyte 113 and the third solid electrolyte 114.

The halide solid electrolyte is represented by, for example, the following composition formula (4). In the composition formula (4), α, β, and γ are each independently a value greater than 0. M includes at least one element selected from the group consisting of a metalloid element and a metal element other than Li. X includes at least one selected from the group consisting of F, Cl, Br, and I.

$$Li_\alpha M_\beta X_\gamma \quad (4)$$

Metalloid elements include B, Si, Ge, As, Sb, and Te. Metal elements include: all elements included in Groups 1 to 12 of the periodic table, except for hydrogen; and all elements included in Groups 13 to 16 of the periodic table, except for B, Si, Ge, As, Sb, Te, C, N, P, O, S, and Se. Metal elements are a group of elements that can be cations when they form an inorganic compound with a halogen or with a halogen compound.

As the halide solid electrolyte, $Li_3YX_6$, $Li_2MgX_4$, $Li_2FeX_4$, $Li(Al, Ga, In)X_4$, $Li_3(Al, Ga, In)X_6$, or the like can be used.

The above configuration can improve the power density of the battery 2000. The above configuration can also improve the thermal stability of the battery 2000 and can inhibit the generation of harmful gas such as hydrogen sulfide.

In the present disclosure, when an element in a formula is expressed as, e.g., "(Al, Ga, In)", it indicates at least one element selected from the group of elements in parentheses. That is, "(Al, Ga, In)" means the same as "at least one selected from the group consisting of Al, Ga, and In". The same applies to other elements. The halide solid electrolyte exhibits excellent ionic conductivity.

In the composition formula (4), M may include Y (=yttrium).

In the composition formula (4), 2.5≤α≤3, 1≤β≤1.1, and γ=6 may be satisfied.

In the composition formula (4), X may include at least one selected from the group consisting of Cl and Br.

The above composition can further improve the ionic conductance of the solid electrolyte. This improves the power density of the battery.

A halide solid electrolyte containing Y may be a compound represented by the following composition formula (5).

$$Li_a M_b Y_c X_6 \quad (5)$$

In the composition formula (5), a+mb+3c=6 and c>0 are satisfied. In the composition formula (5), M includes at least one element selected from the group consisting of a metalloid element and a metal element other than Li and Y. m is the valence of M. X includes at least one selected from the group consisting of F, Cl, Br, and I. M includes at least one selected from the group consisting of Mg, Ca, Sr, Ba, Zn, Sc, Al, Ga, Bi, Zr, Hf, Ti, Sn, Ta, and Nb. Specific examples of the halide solid electrolyte containing Y include $Li_3YF_6$, $Li_3YCl_6$, $Li_3YBr_6$, $Li_3YI_6$, $Li_3YBrCl_5$, $Li_3YBr_3Cl_3$, $Li_3YBr_5Cl$, $Li_3YBr_5I$, $Li_3YBr_3I_3$, $Li_3YBrI_5$, $Li_3YClI_5$, $Li_3YCl_3I_3$, $Li_3YCl_5I$, $Li_3YBr_2Cl_2I_2$, $Li_3YBrCl_4I$, $Li_{2.7}Y_{1.1}Cl_6$, $Li_{2.5}Y_{0.5}Zr_{0.5}Cl_6$, and $Li_{2.5}Y_{0.3}Zr_{0.7}Cl_6$.

The above configuration can further improve the power density of the battery 2000.

Examples of the sulfide solid electrolytes include $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, and $Li_{10}GeP_2S_{12}$. LiX, $Li_2O$, $MO_q$, $Li_pMO_q$, or the like may be added thereto. The element X in "LiX" is at least one element selected from the group consisting of F, Cl, Br, and I. The element M in "$MO_q$" and "$Li_pMO_q$" is at least one element selected from the group consisting of P, Si, Ge, B, Al, Ga, In, Fe, and Zn. p and q in "$MO_q$" and "$Li_pMO_q$" are each independently a natural number.

The battery 2000 configured as above includes a sulfide solid electrolyte with excellent reduction stability and thus can use a low-potential negative electrode material such as graphite or metallic lithium. Accordingly, the energy density of the battery 2000 can be improved.

Examples of the oxide solid electrolytes include: NASICON solid electrolytes typified by $LiTi_2(PO_4)_3$ and element-substituted products thereof; (LaLi)$TiO_3$-based perovskite solid electrolytes; LISICON solid electrolytes typified by $Li_{14}ZnGe_4O_{16}$, $Li_4SiO_4$, and $LiGeO_4$ and element-substituted products thereof; garnet solid electrolytes typified by $Li_7La_3Zr_2O_{12}$ and element-substituted products thereof; $Li_3N$ and H-substituted products thereof; $Li_3PO_4$ and N-substituted products thereof; and glass and glass ceramics obtained by adding a material such as $Li_2SO_4$ or $Li_2CO_3$ to a base material containing a Li—B—O compound such as $LiBO_2$ or $Li_3BO_3$.

Examples of the polymer solid electrolytes include compounds composed of a polymer compound and a lithium salt. The polymer compound may have an ethylene oxide structure. Since the polymer compound with the ethylene oxide structure can contain a large amount of lithium salt, this can further improve the ionic conductance. Examples of the lithium salt include $LiPF_6$, $LiBF_4$, $LiSbF_6$, $LiAsF_6$, $LiSO_3CF_3$, $LiN(SO_2CF_3)_2$, $LiN(SO_2C_2F_6)_2$, $LiN(SO_2CF_3)(SO_2C_4F_3)$, and $LiC(SO_2CF_3)_3$. As the lithium salt, one lithium salt selected from them may be used alone, or a mixture of two or more lithium salts selected from them may be used.

Examples of the complex hydride solid electrolytes include $LiBH_4$—LiI and $LiBH_4$—$P_2S_5$.

The above composition can improve the power density of the battery 2000.

The electrolyte layer 202 may contain a solid electrolyte as a main component. In other words, the electrolyte layer 202 may contain 50% or more of the solid electrolyte by weight (i.e., 50 wt % or more of the solid electrolyte) with respect to the total weight of the electrolyte layer 202.

This can further improve the charge and discharge characteristics of the battery 2000.

The electrolyte layer 202 may contain 70% or more of the solid electrolyte by weight (i.e., 70 wt % or more of the solid electrolyte) with respect to the total weight of the electrolyte layer 202.

This can still further improve the charge and discharge characteristics of the battery 2000.

In addition to the solid electrolyte as the main component, the electrolyte layer 202 may further contain inevitable impurities, or starting materials used for synthesis of the third solid electrolyte 114, by-products, degradation products, and the like.

The electrolyte layer 202 may contain 100% of the solid electrolyte by weight (i.e., 100 wt % of the solid electrolyte) with respect to the total weight of the electrolyte layer 202, except for inevitable impurities.

This can still further improve the charge and discharge characteristics of the battery 2000.

As described above, the electrolyte layer 202 may consist of a solid electrolyte.

The electrolyte layer 202 may contain only one solid electrolyte selected from the group of solid electrolytes described above, or may contain two or more solid electrolytes selected from the group of solid electrolytes described above. The plurality of solid electrolytes have compositions that differ from each other. For example, the electrolyte layer 202 may contain a halide solid electrolyte and a sulfide solid electrolyte.

The electrolyte layer 202 may have a thickness of 1 μm or more and 300 μm or less. When the thickness of the electrolyte layer 202 is 1 μm or more, the positive electrode 201 and the negative electrode 203 can be more reliably separated from each other. When the thickness of the first electrolyte layer 202 is 300 μm or less, high power operation can be achieved.

The negative electrode 203 contains a material having properties of occluding and releasing metal ions (e.g., lithium ions). The negative electrode 203 contains a negative electrode active material, for example.

As the negative electrode active material, a metal material, a carbon material, an oxide, a nitride, a tin compound, a silicon compound, or the like can be used. The metal material may be a single metal. Alternatively, the metal material may be an alloy. Examples of the metal material include lithium metal and lithium alloys. Examples of the carbon material include natural graphite, coke, carbon undergoing graphitization, carbon fibers, spherical carbon, artificial graphite, and amorphous carbon. From the viewpoint of capacity density, silicon (Si), tin (Sn), a silicon compound, or a tin compound may be used.

The negative electrode 203 may contain a solid electrolyte. The above configuration improves the lithium ion conductivity inside the negative electrode 203, whereby high power operation becomes possible. As the solid electrolyte, the materials described above may be used.

The particles of the negative electrode active material may have a median diameter of 0.1 μm or more and 100 μm or less. When the median diameter of the particles of the negative electrode active material is 0.1 μm or more, the negative electrode active material and the solid electrolyte can form a favorable dispersion state in the negative electrode 203. This improves the charge and discharge characteristics of the battery 2000. When the median diameter of the particles of the negative electrode active material is 100 μm or less, the lithium diffusion in the particles of the negative electrode active material becomes faster. This enables high power operation of the battery 2000.

The median diameter of the particles of the negative electrode active material may be larger than the median diameter of particles of the solid electrolyte contained in the negative electrode 203. This allows the negative electrode active material and the solid electrolyte to form a favorable dispersion state.

When the volume ratio between the negative electrode active material and the solid electrolyte in the negative electrode 203 is expressed as "v2:100–v2", the volume ratio v2 of the negative electrode active material may satisfy $30 \leq v2 \leq 95$. When $30 \leq v2$ is satisfied, the battery 2000 can have a sufficient energy density. When $v2 \leq 95$ is satisfied, high power operation becomes possible.

The negative electrode 203 may have a thickness of 10 μm or more and 500 μm or less. When the thickness of the negative electrode 203 is 10 μm or more, the battery 2000 can have a sufficient energy density. When the thickness of the negative electrode 203 is 500 μm or less, high power operation becomes possible.

At least one of the positive electrode 201, the electrolyte layer 202, and the negative electrode 203 may contain a binder to improve the adhesion between particles. The binder is used to improve the binding properties of the materials constituting the electrodes. Examples of the binder include polyvinylidene fluoride, polytetrafluoroethylene, polyethylene, polypropylene, aramid resin, polyamide, polyimide, polyamide-imide, polyacrylonitrile, polyacrylic acid, poly(acrylic acid methyl ester), poly(acrylic acid ethyl ester), poly(acrylic acid hexyl ester), polymethacrylic acid, poly(methacrylic acid methyl ester), poly(methacrylic acid ethyl ester), poly(methacrylic acid hexyl ester), polyvinyl acetate, polyvinylpyrrolidone, polyether, polyether sulfone, hexafluoropolypropylene, styrene-butadiene rubber, and carboxymethyl cellulose. Also, the binder may be a copolymer of two or more materials selected from tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene. The binder may be a mixture of two or more materials selected from them.

At least one of the positive electrode 201 and the negative electrode 203 may contain a conductive additive to improve the electronic conductivity. Examples of the conductive additive include: graphite such as natural graphite and artificial graphite; carbon blacks such as acetylene black and Ketjen black; conductive fibers such as carbon fibers and metal fibers; carbon fluoride; metal powders such as aluminum powder; conductive whiskers such as zinc oxide whiskers and potassium titanate whiskers; conductive metal oxides such as titanium oxide; and conductive polymer compounds such as polyaniline, polypyrrole, and polythiophene. Cost reduction can be achieved by using a carbon conductive additive.

The battery 2000 of Embodiment 2 can be embodied as batteries with various shapes, including a coin battery, a cylindrical battery, a prismatic battery, a sheet-like battery, a button battery, a flat-type battery, and a stacked battery.

MODIFICATION

Figure 1B:
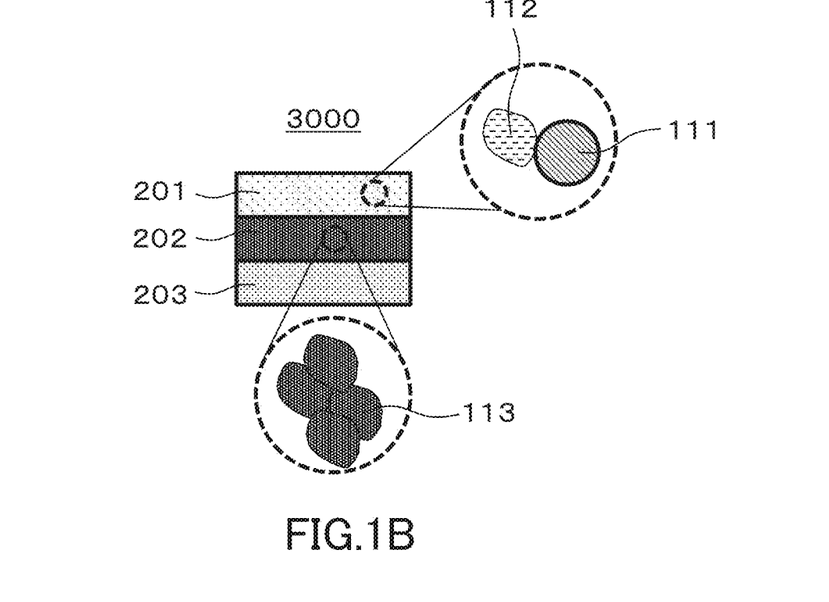
FIG. 1B is a cross-sectional view schematically showing the structure of a battery according to a modification.

FIG. 1B is a cross-sectional view schematically showing the structure of a battery 3000 according to a modification. The battery 3000 includes a positive electrode 201, a negative electrode 203, and an electrolyte layer 202. The electrolyte layer 202 corresponds to the first electrolyte layer 202a described in Embodiment 2. That is, the battery 3000 has the same structure as the battery 2000, except that it does not include the second electrolyte layer 202b. Unless technically incompatible, the above descriptions regarding the battery 2000 also apply to the battery 3000.

EXAMPLES

The present disclosure will be described in detail below with reference to an example and a comparative example.
<Measurement of Oxidation Potential of Br>
(Production of Evaluation Battery 1)

In an argon atmosphere with a dew point of −60° C. or less, LiBr and YBr$_3$ were prepared as raw material powders at a molar ratio of LiBr:YBr$_3$=3:1. Subsequently, the resulting mixture of the raw material powders was subjected to a milling process at a rotational speed of 600 rpm for 25 hours using a planetary ball mill (Type P-7, manufactured by Fritsch GmbH). Li$_3$YBr$_6$ powder was thus obtained. Hereinafter, this solid electrolyte is referred to as "LYB".

In an argon atmosphere with a dew point of −60° C. or less, LYB and acetylene black were prepared at a mass ratio of 93:7. They were mixed together in an agate mortar to produce a mixed material.

80 mg of a sulfide solid electrolyte, 20 mg of LYB, and 5 mg of the above-described mixed material were stacked in this order in an insulating outer cylinder. As the sulfide solid electrolyte, Li$_6$PS$_5$Cl powder was used. A pressure of 720 MPa was applied to the thus-obtained stack.

Next, as a negative electrode, an In—Li foil was stacked on the layer of the sulfide solid electrolyte. A pressure of 80 MPa was applied to the stack composed of the mixed material, the electrolyte layer, and the negative electrode.

Next, current collectors made of stainless steel were placed on the top and the bottom of the stack. The current collectors were provided with current collector leads. Finally, the insulating outer cylinder was sealed with an insulating ferrule to shield the interior of the insulating outer cylinder from the outside atmosphere.

An evaluation battery 1 for evaluating the oxidation potential of Br was thus obtained. The stacking structure of the evaluation battery 1 was as follows: (LYB+acetylene black)/LYB/sulfide solid electrolyte layer/In—Li.
(Production of Evaluation Battery 2)

In an argon atmosphere with a dew point of −60° C. or less, LiCl, YCl$_3$, and YBr$_3$ were prepared as raw material powders at a molar ratio of LiCl, YCl$_3$, and YBr$_3$=3.000:0.333:0.666. They were pulverized and mixed together in a mortar. Then, the thus-obtained mixture of the raw material powders was fired in an argon atmosphere at 500° C. for 3 hours using an electric furnace. The thus-obtained material was pulverized using a pestle and a mortar. Li$_3$YBr$_2$Cl$_4$ powder was thus obtained. Hereinafter, this solid electrolyte is referred to as "LYBC".

An evaluation battery 2 was produced in the same manner as the evaluation battery 1, except that LYBC was used. The stacking structure of the evaluation battery 2 was as follows: (LYBC+acetylene black)/LYBC/sulfide solid electrolyte layer/In—Li.
(Production of Evaluation Battery 3)

In an argon atmosphere with a dew point of −60° C. or less, LiCl and YCl$_3$ were prepared as raw material powders at a molar ratio of LiCl:YCl$_3$=2.7:1.1. Subsequently, the resulting mixture of the raw material powders was subjected to a milling process at a rotational speed of 600 rpm for 25 hours using a planetary ball mill (Type P-7, manufactured by Fritsch GmbH). Li$_{2.7}$Y$_{1.1}$Cl$_6$ powder was thus obtained. Hereinafter, this solid electrolyte is referred to as "LYC".
(Production of Evaluation Battery 3)

An evaluation battery 3 was produced in the same manner as the evaluation battery 1, except that LYC was used. The stacking structure of the evaluation battery 3 was as follows: (LYC+acetylene black)/LYC/sulfide solid electrolyte layer/In—Li.
(LSV Measurement)

Each of the evaluation batteries was subjected to linear sweep voltammetry (LSV) measurement. First, the battery was placed in a thermostatic chamber set at 25° C. The evaluation battery was connected to a potentio-galvanostat to perform LSV measurement. The LSV measurement was performed with the sweep rate set to 10 mV/s. The scanning range was set from the open circuit voltage (OCV) to 4.0 V vs. In—Li. In the LSV measurement, the current responses obtained when the potential was swept from the OCV to 4.0 V were plotted.

Figure 2:
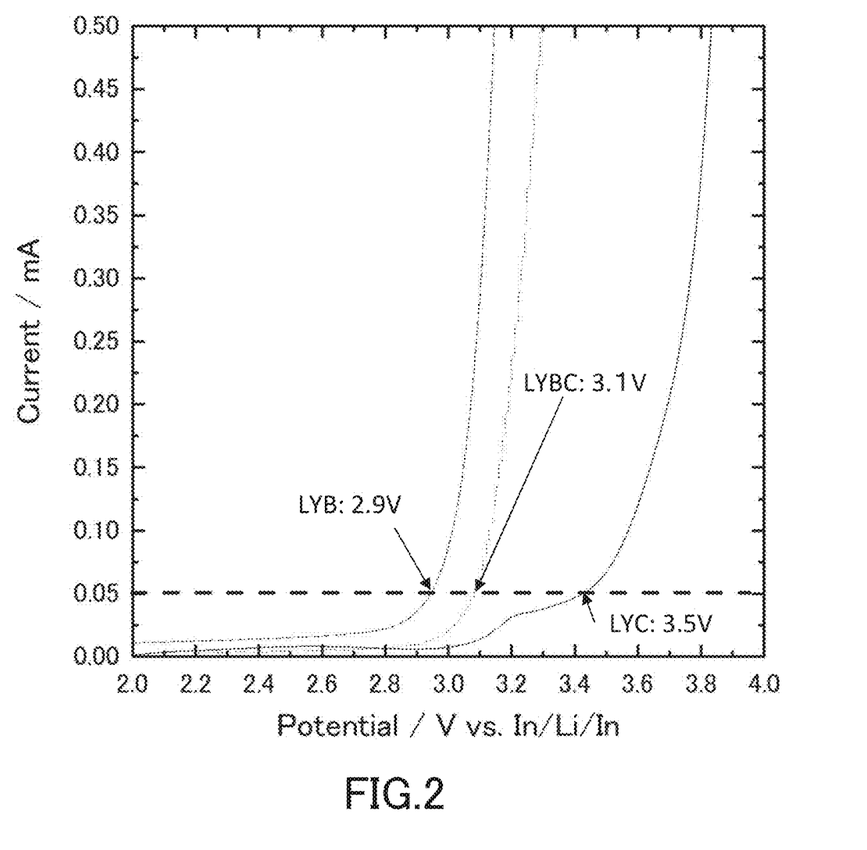
FIG. 2 is a graph showing the results of LSV measurement.

FIG. 2 is a graph showing the results of the LSV measurement. In LSV measurement, when the swept potential reaches a certain potential, a solid electrolyte is oxidized at that potential, thereby causing a current to flow. As can be seen from FIG. 2, LYB had an oxidation potential of 2.9 V vs. In—Li. LYBC had an oxidation potential of 3.1 V vs. In—Li. LYC had an oxidation potential of 3.5 V vs. In—Li.

In the case of the solid electrolyte containing Br, such as LYB or LYBC, the oxidation current rose up in the vicinity of 2.9 V to 3.1 V, and this revealed that the oxidation potential of Br in the solid electrolyte is in this range. The oxidation potential vs. Li of Br in the solid electrolyte can be calculated by adding 0.6 V (the potential of In—Li alloy vs. Li) to the potential of LYB (2.9 V). That is, according to the results obtained using the evaluation battery 1 (LYB), the oxidation potential of Br in the solid electrolyte versus Li potential was 3.5 V.

LYC had an oxidation potential of 3.5 V vs. In—Li. The oxidation potential of 3.5 V is equivalent to the potential vs. Li of 4.1 V. That is, it is considered that, in the case of the solid electrolyte containing Cl, long-time exposure to a potential of 4.1 V or more causes oxidization of Cl in the solid electrolyte, leading to collapse of the structure of the solid electrolyte.

From these results, it was found that a suitable potential for allowing debromination of a solid electrolyte containing Br to proceed is in the range of more than 3.5 V and less than 4.1 V relative to the potential of Li.

In this measurement, the point at which the current value reached 0.05 mA was regarded as the oxidation potential of each of the solid electrolytes. The rise of an oxidation current varies depending on the temperature at which measurement is performed, conditions under which an evaluation battery is produced, and the like. Therefore, the oxidation potential determined in this measurement is considered to have an error margin of about ±0.2 V.

LYB had an oxidation potential of 2.9 V vs. In—Li. LYBC had an oxidation potential of 3.1 V vs. In—Li. These facts indicate that, even if a solid electrolyte contains Br, there may be a difference of about 0.2 V in the oxidation potential depending on the composition of the solid electrolyte.

[Production of Secondary Battery]

Example 1

In an argon atmosphere with a dew point of −60° C. or less, LiCl, $YCl_3$, and $YBr_3$ were prepared as raw material powders at a molar ratio of LiCl, $YCl_3$, and $YBr_3$=3.000: 0.333:0.666. They were pulverized and mixed together in a mortar. Then, the thus-obtained mixture of the raw material powders was fired in an argon atmosphere at 500° C. for 3 hours using an electric furnace. The thus-obtained material was pulverized using a pestle and a mortar. $Li_3YBr_2Cl_4$ powder was thus obtained.

In an argon atmosphere with a dew point of −60° C. or less, Li(Ni, Co, Mn)$O_2$ (hereinafter referred to as "NCM") as a positive electrode active material, LYBC as a solid electrolyte, and vapor grown carbon fibers (VGCF, manufactured by Showa Denko K.K.) as a conductive additive were prepared at a mass ratio of 71:27:2. They were mixed together in an agate mortar to produce a positive electrode mixture.

80 mg of a sulfide solid electrolyte, 20 mg of LYBC, and 19.5 mg of the above-described positive electrode mixture were stacked in this order in an insulating outer cylinder. As the sulfide solid electrolyte, $Li_6PS_5Cl$ powder was used. A pressure of 720 MPa was applied to the thus-obtained stack, whereby a positive electrode and an electrolyte layer were obtained.

Next, a Li foil was placed on a surface of the electrolyte layer opposite to a surface in contact with the positive electrode. A pressure of 80 MPa was applied to the positive electrode, the electrolyte layer, and the Li foil, whereby a stack composed of the positive electrode, the electrolyte layer, and a negative electrode was produced.

Next, current collectors made of stainless steel were placed on the top and the bottom of the stack. The current collectors were provided with current collector leads. Finally, the insulating outer cylinder was sealed with an insulating ferrule to shield the interior of the insulating outer cylinder from the outside atmosphere.

Next, a current of 0.140 mA was applied to the stack until the voltage reached 3.65 V. Then, the stack was charged with a constant voltage of 3.65 V, and the charging was stopped when the current value decayed to 0.028 mA. Thereafter, the stack was discharged with a constant current until the voltage reached 2.5 V. A series of these processes correspond to a debromination treatment. The debromination treatment includes charging the stack with a constant voltage that is equal to or higher than the voltage at which the potential of the positive electrode is equal to the oxidation potential of bromine contained in the solid electrolyte. More specifically, the debromination treatment includes charging the stack with a constant current to a voltage at which the potential of the positive electrode is equal to the oxidation potential of bromine contained in the solid electrolyte and charging the stack with a constant voltage that is equal to or higher than the voltage at which the potential of the positive electrode is equal to the oxidation potential of bromine contained in the solid electrolyte. The voltage in the constant voltage charging may be equal to or higher than the voltage at which the potential of the positive electrode is equal to the oxidation potential of the bromine contained in the solid electrolyte and lower than the battery voltage at which the potential of the positive electrode is equal to the oxidation potential of chlorine.

A secondary battery of the example was thus produced.

Comparative Example 1

A secondary battery was produced in the same manner as in the example, except that the debromination treatment was not performed.

[Composition Analysis]

The secondary battery of the example was disassembled, and a power generating element, which includes the positive electrode, the electrolyte, and the negative electrode, was taken out from the insulating outer cylinder. The power generating element was cut in the thickness direction, and the cross-section was then smoothed by argon ion milling. Thereafter, the composition near the interface between the positive electrode and the electrolyte layer was analyzed using a field emission scanning electron microscope-energy dispersive X-ray analyzer (FE-SEM-EDX) to determine c1, c2, c3, d1, d2, d3, e1, e2, and e3 in the composition formulae (1), (2), and (3).

Figure 4:
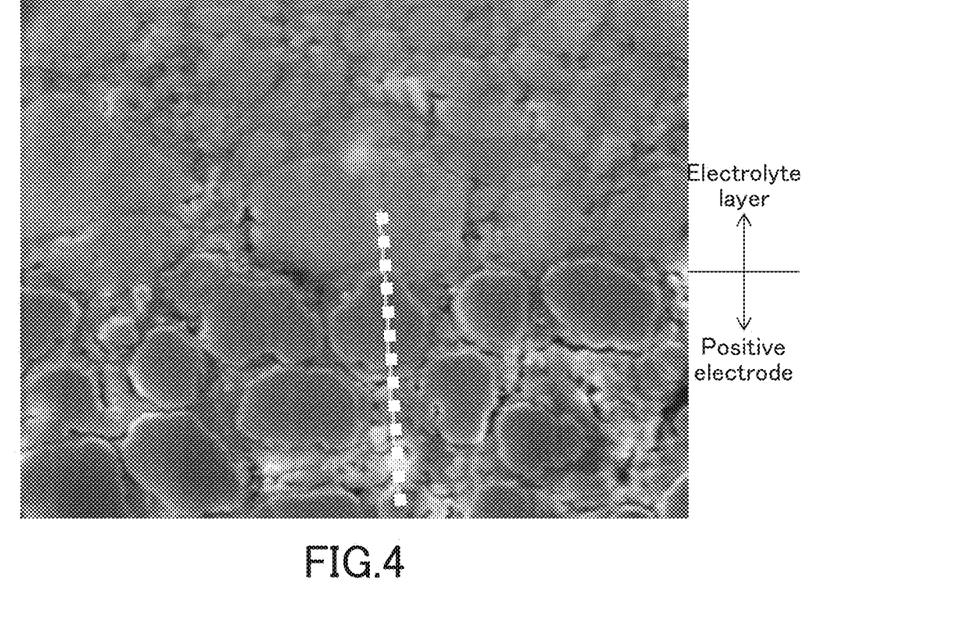
FIG. 4 is a SEM image showing a cross-section of the secondary battery of the example, having been subjected to a debromination treatment.
Figure 5A:
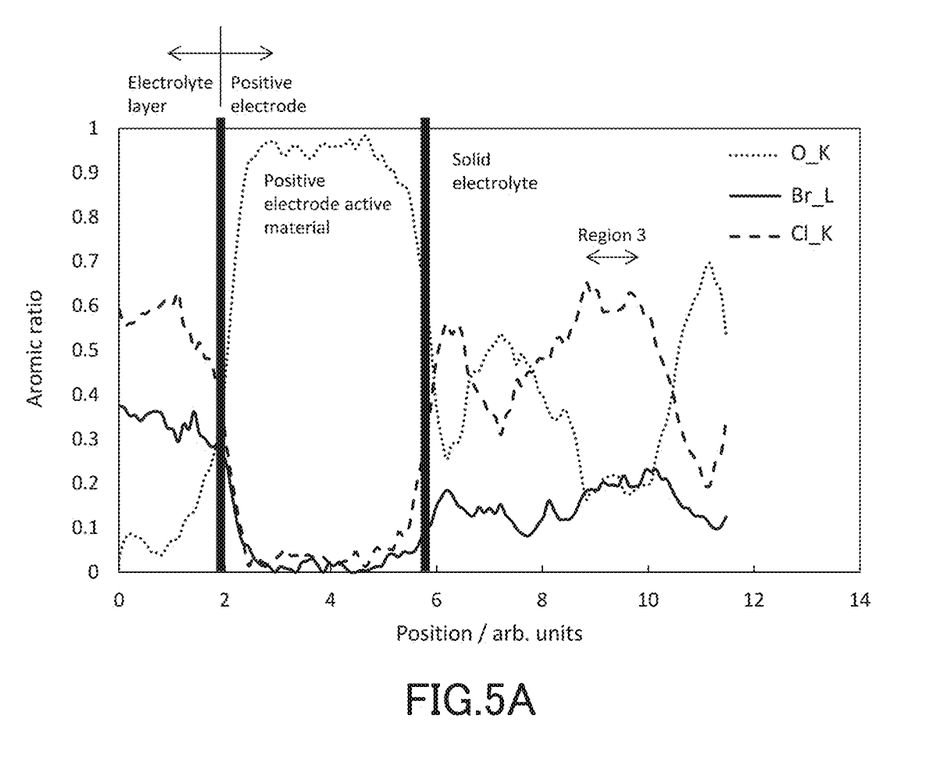
FIG. 5A is a graph showing the ratio of each type of anion present in a portion indicated with the dashed line in FIG. 4.

FIG. 4 is a SEM image showing a cross-section of the positive electrode and electrolyte layer having been subjected to the debromination treatment. FIG. 5A is a graph showing the ratio of each type of anion present in a portion indicated with the dashed line in FIG. 4.

[Charge and Discharge Test]

The secondary battery of each of the example and the comparative example was placed in a thermostatic chamber set at 25° C. The secondary battery was charged with a constant current of 0.140 mA, and the charging was terminated when the voltage reached 4.3 V. Next, the secondary battery was discharged also with a current of 0.140 mA, and the discharging was terminated when the voltage reached 2.5 V. The results are shown in Table 1 and FIG. 3.

Table 1 shows the charge and discharge efficiencies of the secondary batteries of the example and the comparative example. The charge and discharge efficiency of the secondary battery of the comparative example was 90%. The charge and discharge efficiency of the secondary battery of the example was 92%. The debromination treatment improved the charge and discharge efficiency. The charge and discharge efficiency in this case refers to a value obtained by dividing the initial discharge capacity by the initial charge capacity.

TABLE 1

|  | Debromination treatment | Charge and discharge efficiency (%) |
|---|---|---|
| Comparative Example | Not Performed | 90 |
| Example | Performed | 92 |

Figure 3:
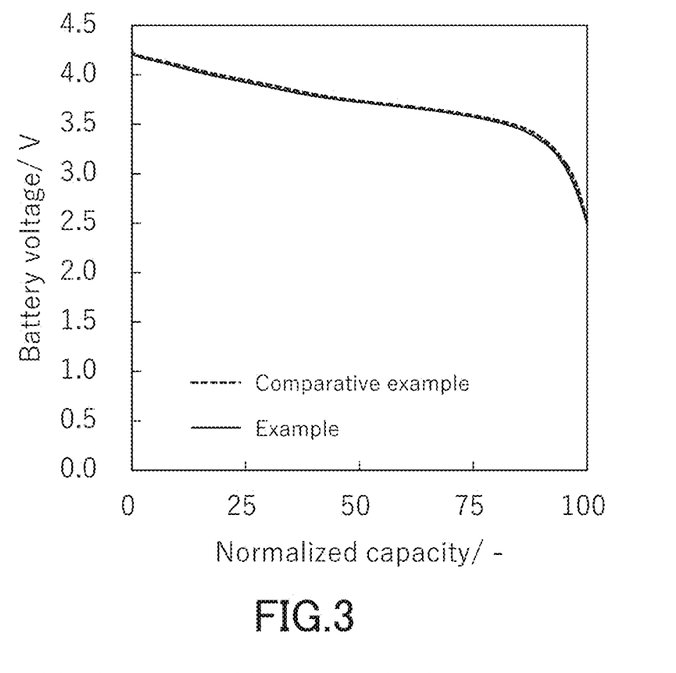
FIG. 3 is a graph showing discharge curves of secondary batteries of an example and a comparative example during initial discharging.

FIG. 3 is a graph showing discharge curves of the secondary batteries of the example and the comparative example during the initial discharging. As can be seen from FIG. 3, there was no noticeable difference between the discharge curve of the example and the discharge curve of the comparative example. That is to say, the debromination treatment did not have much effect on the discharge curve during the initial discharging.

Figure 5B:
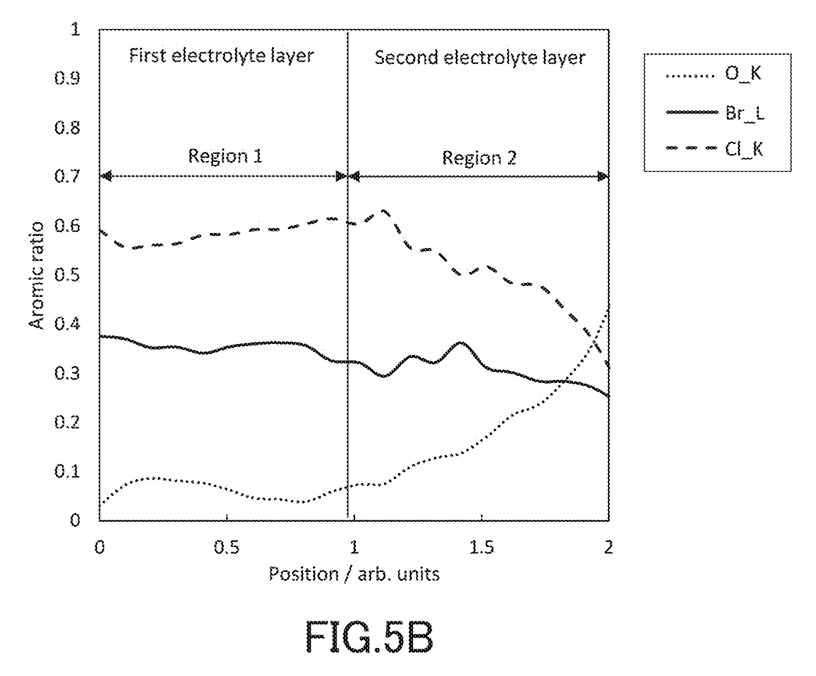
FIG. 5B is a fragmentary enlarged view of FIG. 5A.

As indicated with the dashed line in FIG. 4, the cross-section of the secondary battery of the example was analyzed using the EDX to examine the composition of a portion extending from the electrolyte layer to the positive electrode. The results are shown in FIGS. 5A and 5B.

FIG. 5A is a graph showing the ratio of each type of anion present in the portion indicated with the dashed line in FIG. 4 in terms of atomic ratio. FIG. 5B is a fragmentary enlarged view of FIG. 5A. The anions are oxygen, bromine, and chlorine. The ratio of each anion was calculated from the composition ratio measured using the EDX. The regions used for the calculation were regions 1, 2, and 3 shown in FIGS. 5A and 5B. These regions each had a width of 1 μm. The ratio of Br anion was calculated using average values of data obtained at a plurality of points in each region. Table 2 shows the results thereof. In the SEM image of the cross-section, a region corresponding to the region 3 included no particles of the positive electrode active material, and also, the region 3 was sufficiently spaced apart from the particles of the positive electrode active material. These facts constitute grounds for determining that the region 3 represents the first solid electrolyte contained in the positive electrode.

TABLE 2

|  | Molar ratio of Br |
|---|---|
| Region 1 | $(\beta 2/\alpha 2) = 0.36$ |
| Region 2 | $(\beta 3/\alpha 3) = 0.30$ |
| Region 3 | $(\beta 1/\alpha 1) = 0.19$ |

The definitions of $\alpha 1$, $\alpha 2$, $\alpha 3$, $\beta 1$, $\beta 2$ and $\beta 3$ in Table 2 are as follows. The solid electrolyte contained in the positive electrode is defined as the first solid electrolyte. The solid electrolytes contained in the electrolyte layer are defined as a second solid electrolyte (on the negative electrode side) and a third solid electrolyte (on the positive electrode side). The total amount of substance of the anions in the first solid electrolyte is defined as $\alpha 1$, and the amount of substance of a bromine anion in the first solid electrolyte is defined as $\beta 1$. The total amount of substance of the anions in the second solid electrolyte is defined as $\alpha 2$, and the amount of substance of a bromine anion in the second solid electrolyte is defined as $\beta 2$. The total amount of substance of the anions in the third solid electrolyte is defined as $\alpha 3$, and the amount of substance of a bromine anion in the third solid electrolyte is defined as $\beta 3$.

As can be seen from the value of $\beta 1/\beta 1$ shown in Table 2, the molar ratio of Br to the anions contained in the solid electrolyte (first solid electrolyte) in the positive electrode was 0.19. The molar ratio of Br to the anions contained in each of the solid electrolytes used in the electrolyte layer was 0.36 or 0.30. That is, the molar ratio of Br to the anions contained in the solid electrolyte (first solid electrolyte) in the positive electrode was smaller than the molar ratio of Br to the anions contained in the solid electrolyte (second solid electrolyte) used in the electrolyte layer. In other words, the relationship $\beta 1/\alpha 1 < \beta 2/\alpha 2$ was satisfied in the graphs of FIGS. 5A and 5B.

In FIG. 5B, the region 1 corresponds to the first electrolyte layer 202a described with reference to FIG. 1A and contained the second solid electrolyte. The region 2 corresponds to the second electrolyte layer 202b described with reference to FIG. 1A and contained the third solid electrolyte. Note here that the solid electrolyte used in the region 1 and the solid electrolyte used in the region 2 initially had the same composition.

As can be seen from FIG. 5B, the composition of the electrolyte layer changed gradually toward the interface between the electrolyte layer and the positive electrode. That is, the molar ratio of Br to the anions contained in the region 2 corresponding to the second electrolyte layer was smaller than the molar ratio of Br to the anions contained in the region 1 corresponding to the first electrolyte layer. In other words, the relationship $\beta 1/\alpha 1 \leq \beta 3/\alpha 3 < \beta 2/\alpha 2$ was satisfied in the graphs of FIGS. 5A and 5B.

Further, in the region 2 corresponding to the second electrolyte layer, the molar ratio of Br gradually decreased. That is, in the region 2 corresponding to the second electrolyte layer, the ratio $\beta 3/\alpha 3$ on the positive electrode side was lower than the ratio $\beta 3/\alpha 3$ on the first electrolyte layer side.

The graphs shown in FIGS. 5A and 5B are normalized such that the total amount of substance of anions is 1.

Oxygen is not an element contained in the raw materials used to produce the solid electrolytes. It is considered that the oxygen is an element that was derived from oxygen gas in the air, water in the air, and the positive electrode active material, and unavoidably contained in the solid electrolytes. There is a possibility that the debromination treatment might have promoted the introduction of oxygen into the solid electrolytes.

Next, EDX measurement of the secondary battery of the comparative example was performed in the same manner as that for the secondary battery of the example. Thereafter, the molar ratio of bromine to the total amount of bromine and chlorine in each of the electrolyte layer and the positive electrode was calculated. Also for the secondary battery of the example, the molar ratio of bromine to the total amount of bromine and chlorine in each of the electrolyte layer and the positive electrode was calculated. The reason why oxygen was not used in the calculation was to compare the example and the comparative example in a state where the effect of oxygen derived from the positive electrode active material was eliminated.

In the secondary battery of the comparative example, the atomic ratio of Br to the total amount of Br and Cl in the electrolyte layer was approximately the same as the atomic ratio of Br to the total amount of Br and Cl in the positive electrode. In contrast, in the secondary battery of the example, the atomic ratio of Br to the total amount of Br and Cl in the solid electrolyte contained in the positive electrode was much lower than the atomic ratio of Br to the total amount of Br and Cl in the electrolyte layer. The reason for this is considered to be that the debromination treatment reduced the concentration of bromine in the solid electrolyte contained in the positive electrode.

From the above-described results, it is considered that the charge and discharge efficiency was improved because, with the bromine concentration in the solid electrolyte contained in the positive electrode being lower than the bromine concentration in the electrolyte layer, side reactions caused by oxidation could be inhibited even if the potential of the positive electrode exceeded the oxidation potential of bromine during charging.

INDUSTRIAL APPLICABILITY

The battery of the present disclosure can be utilized as, for example, an all-solid-state secondary battery.

What is claimed is:

1. A battery comprising:
a positive electrode;
a negative electrode; and
an electrolyte layer provided between the positive electrode and the negative electrode, wherein
the positive electrode comprises a positive electrode active material and a first solid electrolyte,
the positive electrode active material and the first solid electrolyte are mixed with each other,
the electrolyte layer comprises a second solid electrolyte,
the first solid electrolyte comprises lithium and two or more types of anions,
the second solid electrolyte comprises lithium and two or more types of anions,
the first solid electrolyte and the second solid electrolyte comprise Br,
a molar ratio of Br to the two or more types of anions comprised in the first solid electrolyte is smaller than a molar ratio of Br to the two or more types of anions comprised in the second solid electrolyte,
the first solid electrolyte comprises a material represented by the following composition formula (1):

$$Li_{a1}M1_{b1}Br_{c1}Cl_{d1}X1_{e1} \quad (1)$$

where, in the composition formula (1), M1 comprises at least one element selected from the group consisting of a metalloid element and a metal element other than Li, and X1 is an anion other than Cl and Br, and
$a1>0$, $b1>0$, $c1>0$, $d1 \geq 0$, $e1 \geq 0$, and $d1+e1>0$, and are satisfied, and
the second solid electrolyte comprises a material represented by the following composition formula (2):

$$Li_{a2}M2_{b2}Br_{c2}Cl_{d2}X2_{e2} \quad (2)$$

where, in the composition formula (2), M2 comprises at least one element selected from the group consisting of a metalloid element and a metal element other than Li, and X2 is an anion other than Cl and Br, and
$a2>0$, $b2>0$, $c2>0$, $d2 \geq 0$, $e2 \geq 0$, and $d2+e2>0$ are satisfied.

2. The battery according to claim 1, wherein
the electrolyte layer comprises a first electrolyte layer and a second electrolyte layer,
the first electrolyte layer comprises the second solid electrolyte,
the second electrolyte layer is located between the positive electrode and the first electrolyte layer and comprises a third solid electrolyte, and
the third solid electrolyte comprises a material represented by the following composition formula (3):

$$Li_{a3}M3_{b3}Br_{c3}Cl_{d3}X3_{e3} \quad (3)$$

where, in the composition formula (3), M3 comprises at least one element selected from the group consisting of a metalloid element and a metal element other than Li, and X3 is an anion other than Cl and Br, and
$a3>0$, $b3>0$, $c3 \geq 0$, $d3 \geq 0$, $c3+d3>0$, and $e3 \geq 0$ are satisfied.

3. The battery according to claim 2, wherein
a relationship $\beta1/\alpha1 \leq \beta3/\alpha3 < \beta2/\alpha2$ is satisfied, where a total amount of substance of the anions in the first solid electrolyte is defined as $\alpha1$, an amount of substance of a bromine anion in the first solid electrolyte is defined as $\beta1$, a total amount of substance of the anions in the second solid electrolyte is defined as $\alpha2$, an amount of substance of a bromine anion in the second solid electrolyte is defined as $\beta2$, a total amount of substance of anions in the third solid electrolyte is defined as $\alpha3$, and an amount of substance of a bromine anion in the third solid electrolyte is defined as $\beta3$.

4. The battery according to claim 2, wherein
in the composition formula (1), a ratio $a1/(c1+d1+e1)$ is in a range from 0.3 to 0.6,
in the composition formula (2), a ratio $a2/(c2+d2+e2)$ is in a range from 0.3 to 1, and
in the composition formula (3), a ratio $a3/(c3+d3+e3)$ is in a range from 0.3 to 1.

5. The battery according to claim 2, wherein
a ratio $\beta3/\alpha3$ varies in a thickness direction of the second electrolyte layer, where the total amount of substance of anions in the third solid electrolyte is defined as $\alpha3$ and the amount of substance of a bromine anion in the third solid electrolyte is defined as $\beta3$, and
the ratio $\beta3/\alpha3$ on a positive electrode side is lower than the ratio $\beta3/\alpha3$ on a first electrolyte layer side.

6. The battery according to claim 2, wherein
M3 comprises Y.

7. The battery according to claim 2, wherein
M3 comprises Y and Zr.

8. The battery according to claim 1, wherein
in the composition formula (1), a ratio $a1/(c1+d1+e1)$ is in a range from 0.3 to 0.6, and
in the composition formula (2), a ratio $a2/(c2+d2+e2)$ is in a range from 0.3 to 1.

9. The battery according to claim 1, wherein
the positive electrode comprises an electron conductive material.

10. The battery according to claim 1, wherein
M1 and M2 comprise Y.

11. The battery according to claim 1, wherein
M1 and M2 comprise Y and Zr.

12. The battery according to claim 1, wherein
the positive electrode active material comprises a lithium-containing transition metal oxide.

13. The battery according to claim 1, wherein
$e1>0$.

14. A method for producing a battery,
the battery comprising:
a positive electrode;
a negative electrode; and
an electrolyte layer provided between the positive electrode and the negative electrode, wherein
the positive electrode comprises a positive electrode active material and a first solid electrolyte,
the positive electrode active material and the first solid electrolyte are mixed with each other,
the electrolyte layer comprises a second solid electrolyte,
the first solid electrolyte comprises lithium and two or more types of anions,
the second solid electrolyte comprises lithium and two or more types of anions,
the first solid electrolyte and the second solid electrolyte comprise Br, the first solid electrolyte comprises a material represented by the following composition formula (1):

$$Li_{a1}M1_{b1}Br_{c1}Cl_{d1}X1_{e1} \qquad (1)$$

where, in the composition formula (1), M1 comprises at least one element selected from the group consisting of a metalloid element and a metal element other than Li, and X1 is an anion other than Cl and Br, and a1>0, b1>0, c1>0, d1≥0, e1>0, and d1+e1≥0, and are satisfied, and the second solid electrolyte comprises a material represented by the following composition formula (2):

$$Li_{a2}M2_{b2}Br_{c2}Cl_{d2}X2_{e2} \qquad (2)$$

where, in the composition formula (2), M2 comprises at least one element selected from the group consisting of a metalloid element and a metal element other than Li, and X2 is an anion other than Cl and Br, and a2>0, b2>0, c2>0, d2≥0, e2≥0, and d2+e2>0 are satisfied, the method comprising:

producing a stack that comprises the positive electrode, the electrolyte layer, and the negative electrode; and charging the stack with a constant voltage that is equal to or higher than a voltage at which a potential of the positive electrode is equal to an oxidation potential of bromine comprised in the first solid electrolyte.

15. The method according to claim 14, wherein e1>0.

* * * * *